US010250461B2

(12) United States Patent
Amendjian et al.

(10) Patent No.: US 10,250,461 B2
(45) **Date of Patent: *Apr. 2, 2019**

(54) MIGRATING LEGACY NON-CLOUD APPLICATIONS INTO A CLOUD-COMPUTING ENVIRONMENT

(71) Applicant: International Business Machines Corporation, Armonk, NY (US)

(72) Inventors: Hagop Amendjian, Dollard des Ormeaux (CA); Thomas S. Bergman, Mission Viejo, CA (US); Manvendra Gupta, Brampton (CA); Michael R. Marsonet, Woodbridge (CA); Terrence A. Paul, Nobleton (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/908,887

(22) Filed: Mar. 1, 2018

(65) Prior Publication Data

US 2018/0191582 A1 Jul. 5, 2018

Related U.S. Application Data

(63) Continuation of application No. 15/405,584, filed on Jan. 13, 2017, now Pat. No. 9,992,080, which is a (Continued)

(51) Int. Cl.

*H04L 12/24* (2006.01)
*G06F 9/455* (2018.01)
*H04L 29/08* (2006.01)

(52) U.S. Cl.

CPC ...... *H04L 41/5058* (2013.01); *G06F 9/45558* (2013.01); *H04L 41/20* (2013.01); *H04L 67/10* (2013.01); *G06F 2009/45595* (2013.01)

(58) Field of Classification Search

CPC ..... H04L 41/20; H04L 41/50; H04L 41/5035; H04L 41/5041; H04L 41/5045;

(Continued)

(56) References Cited

U.S. PATENT DOCUMENTS

| | | | |
|---|---|---|---|
| 7,813,822 | B1 | 10/2010 | Hoffberg |
| 7,920,549 | B2 | 4/2011 | Alt et al. |

(Continued)

FOREIGN PATENT DOCUMENTS

| | | |
|---|---|---|
| WO | 2011067062 | 6/2011 |
| WO | 2013082119 | 6/2013 |

OTHER PUBLICATIONS

Albuquerque et al., Virtualization with Automated Services Catalog for Providing Integrated Information Technology Infrastructure, J.M. Alcaraz Calero et al. (Eds.): ATC 2011, LNCS 6906 pp. 75-91 copyright Springer-Verlag Berlin Heidelberg.

(Continued)

*Primary Examiner* — Davoud A Zand

(74) *Attorney, Agent, or Firm* — Schmeiser, Olsen & Watts, LLP; Mark Vallone

(57) ABSTRACT

A method and associated system automatically migrates a non-cloud service from a legacy non-cloud virtualized computing environment into a cloud-computing environment. These methods and systems enhance standard cloud-management systems with the introduction of independent infrastructure-discovery and application-discovery tools. By autonomously examining the legacy non-cloud environment, these tools can produce information describing characteristics of the legacy service in sufficient detail to enable the cloud-management system to generate and automatically insert an entry for the legacy service into the cloud-computing environment's service catalog. When a user of the cloud-computing environment subsequently requests the (Continued)

non-cloud service, the cloud-management platform may then use the new entry to provision the legacy service as though it had been a standard cloud service.

20 Claims, 3 Drawing Sheets

Related U.S. Application Data continuation of application No. 13/971,883, filed on Aug. 21, 2013, now Pat. No. 9,686,154.

(58) Field of Classification Search
CPC ............. H04L 41/5048; H04L 41/5051; H04L 41/5054; H04L 41/5058; H04L 67/10; G06F 9/45558; G06F 2009/45595
See application file for complete search history.

(56) References Cited

U.S. PATENT DOCUMENTS 8,184,641 B2 5/2012 Alt et al.
8,316,125 B2 11/2012 DeHaan
8,533,715 B2 9/2013 Deluca et al.
8,949,654 B2 2/2015 Hasit
9,444,896 B2 9/2016 Zheng et al.
9,632,814 B2 * 4/2017 Bonilla .................. G06F 3/067
9,633,406 B2 * 4/2017 Bala .......................... G06T 1/00
9,686,154 B2 6/2017 Amendjian et al.
9,722,858 B2 * 8/2017 Markley ................. H04L 41/04
9,736,013 B2 * 8/2017 Markley ................. H04L 41/04
9,742,873 B2 8/2017 Ananthanarayanan et al.
2009/0157457 A1 6/2009 Huuhtanen et al.
2010/0058334 A1 3/2010 Mohindra et al.
2011/0126197 A1 5/2011 Larsen et al.
2011/0138047 A1 6/2011 Brown et al.
2011/0153727 A1 6/2011 Li
2012/0042312 A1 2/2012 Isci et al.
2012/0124211 A1 5/2012 Kampas et al.
2012/0130873 A1 5/2012 Morgan
2012/0131161 A1 5/2012 Ferris et al.
2012/0290678 A1 11/2012 Dawson et al.
2013/0339510 A1 12/2013 Douglas et al.
2014/0146055 A1 * 5/2014 Bala .................... G06F 11/1402 345/501
2014/0149494 A1 * 5/2014 Markley ................. H04L 67/34 709/203
2014/0149983 A1 * 5/2014 Bonilla ............... G06F 9/45558 718/1
2014/0282456 A1 9/2014 Drost et al.
2015/0058459 A1 2/2015 Amendjian et al.
2017/0228248 A1 * 8/2017 Bala .................... G06F 9/45558

OTHER PUBLICATIONS

M. Naghshineh et al., IBM Research Division cloud computing initiative, IBM J. Res. & Dev. vol. 53, No. 4, paper 1, 2009, pp. 1-10.
M. Viswanathan et al., ERMIS: Designing, developing and delivering a remote managed infrastructure services solution, IBM J. Res. & Dev., vol. 53, No. 6, paper 8, 2009, pp. 1-18.
Calero et al., (Lecture Notes) Autonomic Trusted Computing,Springer, 8th International Conference, ATC 2011 Banff, Canada, Sep. 2-4, 2011 Proceedings, 3 pages.
Office Action (dated Sep. 18, 2015) for U.S. Appl. No. 13/971,883, filed Aug. 21, 2013.
Van et al., SLA-aware Virtual Resource Management for Cloud Infrastructures, IEEE Ninth International Conference on Computer and Information Technology, 978-0-7695-3836-5/09, copyright 2009 IEEE, DOI 10.1109/CIT.2009.109, pp. 357-362.
Amendment (dated Dec. 9, 2015) for U.S. Appl. No. 13/971,883, filed Aug. 21, 2013.
Final Office Action (dated Jan. 20, 2016) for U.S. Appl. No. 13/971,883, filed Aug. 21, 2013.
RCE and PA (Feb. 22, 2016) for U.S. Appl. No. 13/971,883, filed Aug. 21, 2013.
Office Action (dated May 5, 2016) for U.S. Appl. No. 13/971,883, filed Aug. 21, 2013.
Amendment (dated Jun. 30, 2016) for U.S. Appl. No. 13/971,883, filed Aug. 21, 2013.
Notice of Allowance (dated Nov. 18, 2016) for U.S. Appl. No. 13/971,883, filed Aug. 21, 2013.
Application for U.S. Appl. No. 14/447,833, filed Jul. 31, 2014.
Office Action (dated May 22, 2017) for U.S. Appl. No. 15/405,584, filed Jan. 13, 2017.
Amendment (dated Jun. 28, 2017) for U.S. Appl. No. 15/405,584, filed Jan. 13, 2017.
Office Action (dated Oct. 27, 2017) for U.S. Appl. No. 15/405,584, filed Jan. 13, 2017.
Amendment (dated Oct. 31, 2017) for U.S. Appl. No 15/405,584, filed Jan. 13, 2017.
Notice of Allowance (dated Jan. 26, 2018) for U.S. Appl. No. 15/405,584, filed Jan. 13, 2017.

* cited by examiner

MIGRATING LEGACY NON-CLOUD APPLICATIONS INTO A CLOUD-COMPUTING ENVIRONMENT

This application is a continuation application claiming priority to Ser. No. 15/405,584, filed Jan. 13, 2017, now U.S. Pat. No. 9,992,080, issued Jun. 5, 2018, which is a Continuation of Ser. No. 13/971,883, filed Aug. 21, 2013, U.S. Pat. No. 9,686,154, issued Jun. 20, 2017.

TECHNICAL FIELD

The present invention relates to managing a catalog of services in a cloud-computing environment.

BACKGROUND

A cloud-computing management platform that manages a cloud-computing environment may maintain a service catalog that describes services that the cloud-computing environment can provide. When a user requests a service described by an entry in the service catalog, the cloud-computing management platform uses information comprised by the entry to provide the requested service by provisioning a virtual machine or by installing, configuring, or otherwise deploying application software. Fulfilling the user's request may further comprise, but is not limited to, provisioning, deprovisioning, or modifying an attribute of the service described by the entry in the service catalog.

A virtual machine that is provisioned in an existing virtualized computing environment, where that existing virtualized environment is not a cloud-computing environment, may not be described in such a service catalog. One step of importing that virtual machine and the business applications or services it provides into a cloud-computing environment is generating and entering an entry for the virtual machine, applications, or services into the cloud-computing environment's service catalog.

Such generating, however, generally cannot be performed by an automated means because, among other possible reasons, the virtual machine may be provisioned or configured in a way that does not conform with characteristics of services offered by the cloud-computing environment or with an other convention or standard of the cloud-computing environment. Resolving such issues may require a manual entry-generation procedure that may be cumbersome, vulnerable to error, or time-consuming. When a large enterprise must migrate thousands of such non-cloud virtual machines into a cloud-computing environment, generating corresponding service-catalog entries may become extraordinarily resource-intensive.

BRIEF SUMMARY

A first embodiment of the present invention provides a method for automatically generating an entry of a service catalog of a cloud-computing environment, wherein the cloud-computing environment comprises a cloud-management platform, wherein the cloud-management platform comprises a processor of a computer system that has access to an infrastructure-discovery tool and an application-discovery tool, and wherein the entry describes a characteristic of a virtual service provided by the cloud-computing environment, the method comprising:

the processor receiving infrastructure information about a virtualized computing infrastructure from the infrastructure-discovery tool, wherein the virtualized computing infrastructure comprises a first physical computer that runs a first application on a first virtual machine, and wherein the received information comprises a characteristic of the first virtual machine;

the processor further receiving application information about a characteristic of the first application from the application-discovery tool; and the processor generating the entry as a function of the infrastructure information and the application infrastructure.

A second embodiment of the present invention provides a computer program product, comprising a computer-readable hardware storage device having a computer-readable program code stored therein, said program code configured to be executed by a processor of a computer system to implement a method for automatically generating an entry of a service catalog of a cloud-computing environment, wherein the cloud-computing environment comprises a cloud-management platform, wherein the cloud-management platform comprises the processor of the computer system, wherein the processor of the computer system has access to an infrastructure-discovery tool and an application-discovery tool, and wherein the entry describes a characteristic of a virtual service provided by the cloud-computing environment, the method comprising:

the processor receiving infrastructure information about a virtualized computing infrastructure from the infrastructure-discovery tool, wherein the virtualized computing infrastructure comprises a first physical computer that runs a first application on a first virtual machine, and wherein the received information comprises a characteristic of the first virtual machine;

the processor further receiving application information about a characteristic of the first application from the application-discovery tool; and the processor generating the entry as a function of the infrastructure information and the application infrastructure.

A third embodiment of the present invention provides a computer system comprising a processor, a memory coupled to said processor, and a computer-readable hardware storage device coupled to said processor, said storage device containing program code configured to be run by said processor via the memory to implement a method for automatically generating an entry of a service catalog of a cloud-computing environment, wherein the cloud-computing environment comprises a cloud-management platform, wherein the cloud-management platform comprises the processor of the computer system, wherein the processor of the computer system has access to an infrastructure-discovery tool and an application-discovery tool, and wherein the entry describes a characteristic of a virtual service provided by the cloud-computing environment, the method comprising:

the processor receiving infrastructure information about a virtualized computing infrastructure from the infrastructure-discovery tool, wherein the virtualized computing infrastructure comprises a first physical computer that runs a first application on a first virtual machine, and wherein the received information comprises a characteristic of the first virtual machine;

the processor further receiving application information about a characteristic of the first application from the application-discovery tool; and the processor generating the entry as a function of the infrastructure information and the application infrastructure.

DETAILED DESCRIPTION

Figure 1:
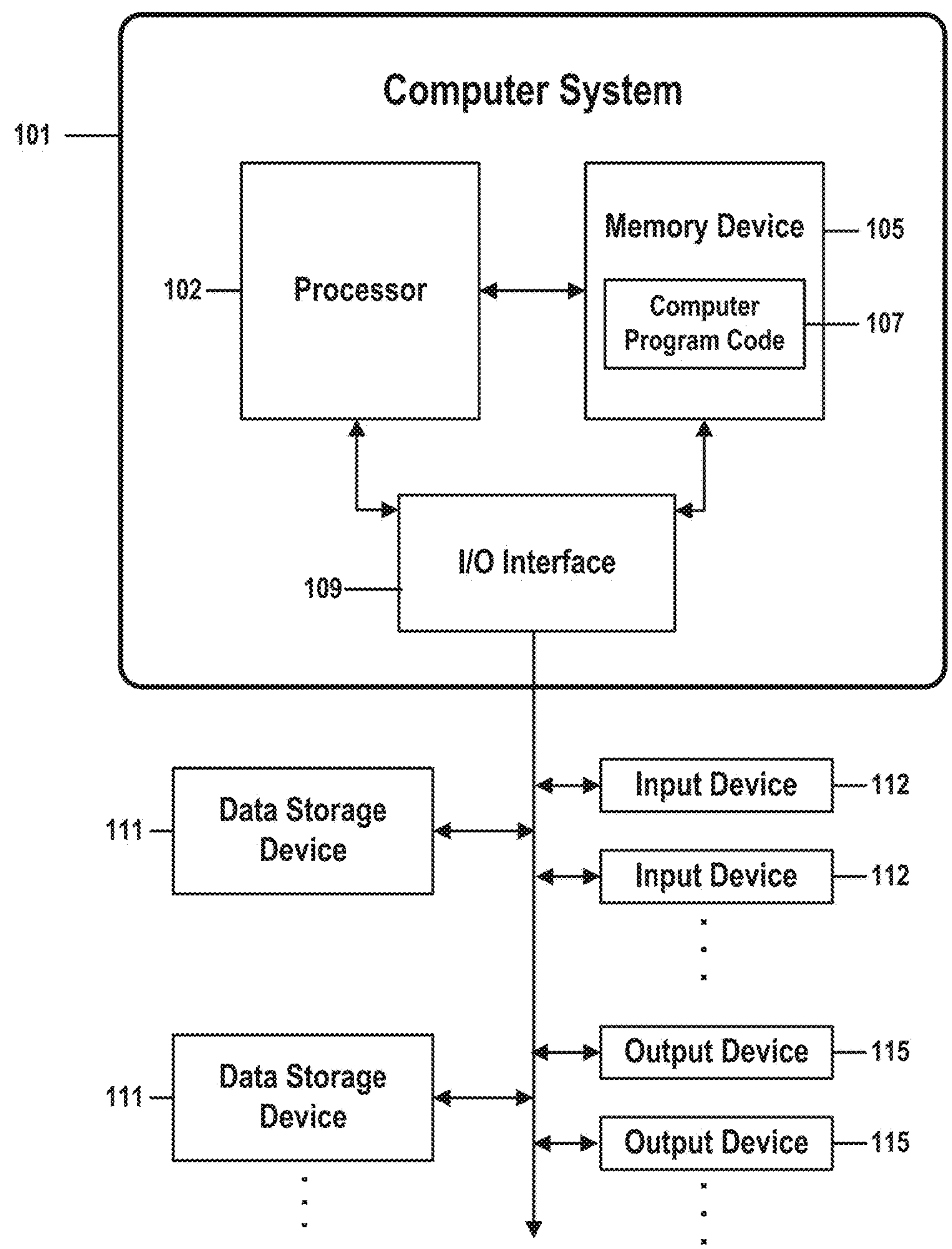
FIG. 1 shows the structure of a computer system and computer program code that may be used to implement a method of generating a service-catalog entry from discovered attributes of provisioned virtual machines in accordance with embodiments of the present invention.

The National Institute of Standards and Technology defines the term "cloud computing" as "a model for enabling ubiquitous, convenient, on-demand network access to a shared pool of configurable computing resources (e.g., networks, servers, storage, applications and services) that can be rapidly provisioned and released with minimal management effort or service provider interaction." The NIST also lists three "service models" (software, platform and infrastructure), and four "deployment models" (private, community, public and hybrid) that categorize ways that a cloud-computing environment may deliver cloud-based virtual services and business applications. See http://www.nist.gov/itl/csd/cloud-102511.cfm. In this document, a reference to a virtualized service, whether offered by a cloud-computing environment or provided by a virtual machine provisioned in a non-cloud environment, may generally be construed to comprising business applications.

Here, the term "deployment" or "deployment workflow" refers to a set of activities that must be performed in order to make a software application or service usable, where such activities may comprise, but are not limited to, provisioning, deprovisioning, installation, configuration, activation, deactivation, versioning, updating, and otherwise modifying an attribute. A "deployment pattern" is a definition of a topology that describes characteristics of a deployment in such a way that the deployment may be more easily performed with consistency by multiple parties at different times. Such a topology may comprise a virtual image that comprises a virtualized resource and applications deployed in the image. In some cases, a deployment pattern may be limited to a single virtual machine or to a single set of application components deployed on one or more similar, identical, or heterogeneous virtual machines.

In some embodiments of the present invention, a "cloud-computing environment" may comprise computing technology that uses central remote servers, connected through the Internet, an intranet, or other networking technology, to offer a service related to maintaining a user's data or applications. In some cloud implementations, a user may request such a service by selecting it from a "service catalog" maintained by a "cloud-management platform" of the cloud-computing environment.

The present invention may operate in a cloud-computing environment that provisions and configures virtual resources provisioned on the cloud-computing environment's physical infrastructure, where those virtual resources may comprise, but are not limited to, combinations of virtual processor, virtual storage, and virtual networking components. Such virtual resources may be provisioned and configured as needed to host business applications and services requested by users from the environment's service catalog.

Such a cloud-computing environment may further comprise a cloud-management platform that manages these cloud-computing services (wherein such cloud-computing services may comprise business applications). The cloud-management platform may provision a service as a function of characteristics of one or more virtual machines, of an application running on a virtual machine, or of combinations thereof. When a user requests such a service, the cloud-management platform may respond by taking one or more actions requested by the user, where an action of the one or more actions may comprise, but is not limited to, provisioning, deprovisioning, or modifying an attribute of a virtual resource on a physical component of the cloud-computing environment and by then launching one or more applications on the virtual machine.

Such a service may be a function of the cloud-computing environment's physical or virtual resources, where these resources may comprise combinations of physical or virtual resources that may comprise one or more computers, communications resources, application software, system software, computers, peripheral devices, other assets related to any of these resources, and combinations thereof.

The requested business application or service may be provided as a further function of a characteristic of any of these resources or assets, where a characteristic may comprise a hardware or a software configuration, a setting, a license for a specific revision of a software entity, a hardware license, a deployment workflow, a deployment pattern, a dependency upon an other software or hardware entity or upon a revision or setting, or an other constraint that may be related to power usage, site configuration, contractual terms, or environmental factors.

The cloud-management platform may manage such a service offering by describing such a characteristic of the offered service in an entry of the service catalog. If an authorized user requests the service described in the service-catalog entry, the cloud-management platform may respond by provisioning a virtual machine to provide all or part of the requested service, where the provisioning may be a function of the entry and wherein a selection of components that comprise the virtual machine and a configuration of the virtual machine and of its components may be further functions of the entry.

This type of service-catalog service-management mechanism may allow the cloud-management platform to improve a characteristic of a service, where the improved characteristic might comprise, but is not limited to, reliability, compatibility, robustness, performance, efficiency, or conformance with a standard or with a convention of the cloud-computing environment.

A cloud-computing service may comprise one or more software applications running all or in part on a virtual machine that is provisioned on a physical computer of the cloud-computing environment. Here, the physical machine may run an operating system and the virtual machine may run as a function of hypervisor software that runs under the operating system.

A service that runs all or in part on such a virtual machine may be described in an associated service-catalog entry as being associated with a certain version of a software application, hypervisor, operating system, or other software, or as further requiring a certain configuration of a physical or virtual computer system, peripheral device, communications resource, or infrastructure. Such a description may enable the cloud-management system to offer standardized services that may be more readily interchangeable, predictable, stable, or robust, and that may be more reliably and efficiently deployed.

Although cloud-computing environments almost always comprise virtual computing resources, it is also possible for a virtualized computing environment to be a "non-cloud"

computing environment. Both types of virtualized environments may comprise two distinct types of platforms: a "manage from" platform that may comprise entities and resources like computers, storage devices, and memory units and that maintains and provides virtual services; and a "manage to" platform that comprises entities and resources like computers, storage devices, memory units, and networks, onto which virtual services may be provisioned by the "manage from" platform.

Cloud and non-cloud virtual computing environments may differ, however, in the way that resources are organized into these two types of platforms. In cloud-computing environments, "manage from" and "manage to" platforms may be maintained as physically distinct computing resources, wherein the "manage from" platform (the "cloud-management" platform) provisions services onto the "manage to" platform (the "cloud"). But in a non-cloud virtual environment, the "manage from" and the "manage to" platforms may share the same resources.

A virtual service offered by a "manage from" cloud-management platform in a cloud-computing environment may be described in an entry in a service catalog. In a cloud-computing environment, such an entry may be generated automatically by a component of the cloud-management platform or by software associated with the cloud-management platform.

But in a "standard" non-cloud environment, a service that is running on a virtual machine may not be associated with an entry in a service catalog because the service was not originally provisioned as part of a partitioned cloud-computing environment. Furthermore, during an effort to migrate services of the non-cloud environment to, or to integrate non-cloud resources into, a cloud-computing environment, it may not be possible to automatically generate a service-catalog entry for a migrated or integrated non-cloud service because a virtual machine associated with the non-cloud service was not provisioned as part of the cloud-computing environment; was configured with hardware, software, or communications settings that do not conform to a standard of, a convention of, or are not optimized for, the cloud-computing environment; or because the service was configured to run on physical or virtual hardware, software, or communications resources that do not conform to a standard or convention of, or are not optimized for, the cloud-computing environment.

When an enterprise plans to migrate virtual resources from a non-cloud environment to a cloud-computing environment, the resulting task of manually migrating large numbers of legacy virtual machines into the cloud environment may create an enormous burden.

In one example, consider a data center that comprises both a cloud-computing environment and a legacy non-cloud computing environment. The two environments may each comprise several thousand virtual machines, storage devices, and networking resources configured in a same data center, where machines in one environment may have no knowledge of the other's virtual resources.

Because the non-cloud virtual resources may be provisioned in the non-cloud environment using heterogeneous hardware and using heterogeneous hypervisors, it may be difficult or impossible for the non-cloud "manage from" management platform to perform tasks such as the startup, shutdown, provisioning, decommissioning, and attribute revisioning of the non-cloud virtual resources. Migrating management of such resources to a cloud-computing environment, however, may provide a common control mechanism that greatly simplifies management tasks because services within the cloud-computing environment that are described in the cloud-computing environment's service catalog may conform to standards that are more easily managed by the cloud-computing environment's cloud-management platform.

Such a migration may require a review and assessment of all physical and virtual attributes of the virtual machines, operating systems, and application programs provisioned on the non-cloud virtual environment, and of the physical infrastructure on which such virtual machines, operating systems, and applications run. Such a review may comprise considerations that include, but are not limited to, relationships among virtual machines, operating systems, and application programs; dependencies of the virtual machines, operating systems, and application programs on underlying physical infrastructure; creation of a list of services provisioned in the non-cloud virtual environment and addition of the list of services into the cloud-computing environment's service catalog as a set of unique entries; migration of these services to the cloud-computing environment; testing to ensure conformance of the migrated services with standards or conventions of the cloud-computing environment; and further testing to ensure that the functionality of the migrated services is an appropriate function of the functionality that was provided by analogous services in the non-cloud virtual environment. In many cases, it may be difficult or impossible to automatically generate such service-catalog entries in the cloud-computing environment because of differences and inconsistencies between implementation details, compatibility issues, standards, and conventions of the cloud and non-cloud platforms.

Embodiments of the present invention address this issue with a method of automatically generating a cloud-computing environment service-catalog entry for a virtual business application or other virtual service that is already running on a virtual machine provisioned in a non-cloud environment. This task may comprise steps of analyzing and correlating information about the service and about the cloud-computing environment, where that information may be generated by automated application-discovery and infrastructure-discovery tools.

An application-discovery tool is a hardware or software tool that may probe infrastructure and resources of a computing environment in order to identify, characterize, and inventory applications running on the computing environment's remote infrastructure. Such a tool may create a topological view of a computing environment that allows an administrator or other individual to identify dependencies among applications, wherein a dependency between two applications may exist if a certain implementation or a configuration of a first application is allowable only if associated with a particular implementation or a configuration of a second application. In an example, a task of deploying a 64-bit version of a word processor may depend upon first provisioning a 64-bit virtual machine on a physical host computer that comprises a 64-bit processor. In this way, an application-discovery tool may provide insight into characteristics of a complex application infrastructure.

An application-discovery tool may further provide information about complex interdependencies among servers, applications, network devices, software, configuration files, operating systems and other IT infrastructure components. Such functionality may allow system administrators to more easily identify and troubleshoot configuration-related application problems, and to more efficiently perform functions like incident management, resource allocation, and critical-resource monitoring.

Some application-discovery tools may further perform more specialized functions like identifying resources that are not actively being monitored, tracking changes to, or other characteristics of, virtual resources, or identifying a way in which a proposed change might affect a dependency, a resource allocation, or an other characteristic of a component of a computing environment.

The functionality of an infrastructure-discovery tool is much like that of an application-discovery tool, except that infrastructure-discovery tools generally identify, characterize, and catalog hardware and software infrastructure components of a computing environment, rather than application software. These infrastructure components may comprise, but are not limited to, servers, storage devices, other types of peripherals, communications devices, virtualization software, middleware, operating systems, and other types of hardware or software entities that create a computing platform upon which applications may be run.

Like an application-discovery tool, an infrastructure-discovery tool may generate a topological or an other type of graphical depiction of a computing environment. Some infrastructure-discovery tools may automatically identify logical dependencies and other relationships among servers and other infrastructure components, utilization trending data and other information that enables administrators to rationalize, virtualize, or consolidate assets to improve operational efficiency, and risk analyses, including identification of an outdated operating system or middleware, a misconfigured or orphan servers, and redundant middleware or other components. An infrastructure-discovery tool's ability to generate and help users navigate custom views of large data sets may further facilitate other sophisticated functions.

Embodiments of the present invention may interoperate both with application-discovery tools and infrastructure-discovery tools known to those skilled in the art of cloud computing today, and with application-discovery tools and infrastructure-discovery tools that may be developed in the future.

FIG. 1 shows the structure of a computer system and computer program code that may be used to implement a method of generating a service-catalog entry from discovered attributes of provisioned virtual machines in accordance with embodiments of the present invention. FIG. 1 refers to objects 101-115.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, in one embodiment, the present invention may take the form of a computer program product comprising one or more physically tangible (e.g., hardware) computer-readable medium(s) or devices having computer-readable program code stored therein, said program code configured to be executed by a processor of a computer system to implement the methods of the present invention. In one embodiment, the physically tangible computer readable medium(s) and/or device(s) (e.g., hardware media and/or devices) that store said program code, said program code implementing methods of the present invention, do not comprise a signal generally, or a transitory signal in particular.

Any combination of one or more computer-readable medium(s) or devices may be used. The computer-readable medium may be a computer-readable signal medium or a computer-readable storage medium. The computer-readable storage medium may be, for example, but is not limited to, an electronic, magnetic, optical, electromagnetic, infrared, or semiconductor system, apparatus, or device, or any suitable combination of the foregoing. More specific examples (a non-exhaustive list) of the computer-readable storage medium or device may include the following: an electrical connection, a portable computer diskette, a hard disk, a random access memory (RAM), a read-only memory (ROM), an erasable programmable read-only memory (EPROM or flash memory), Radio Frequency Identification tag, a portable compact disc read-only memory (CD-ROM), an optical storage device, a magnetic storage device, or any suitable combination of the foregoing. In the context of this document, a computer-readable storage medium may be any physically tangible medium or hardware device that can contain or store a program for use by or in connection with an instruction execution system, apparatus, or device.

A computer-readable signal medium may include a propagated data signal with computer-readable program code embodied therein, for example, a broadcast radio signal or digital data traveling through an Ethernet cable. Such a propagated signal may take any of a variety of forms, including, but not limited to, electro-magnetic signals, optical pulses, modulation of a carrier signal, or any combination thereof.

Program code embodied on a computer-readable medium may be transmitted using any appropriate medium, including but not limited to wireless communications media, optical fiber cable, electrically conductive cable, radio-frequency or infrared electromagnetic transmission, etc., or any suitable combination of the foregoing.

Computer program code for carrying out operations for aspects of the present invention may be written in any combination of one or more programming languages, including, but not limited to programming languages like Java, Smalltalk, and C++, and one or more scripting languages, including, but not limited to, scripting languages like JavaScript, Perl, and PHP. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN), a wide area network (WAN), an intranet, an extranet, or an enterprise network that may comprise combinations of LANs, WANs, intranets, and extranets, or the connection may be made to an external computer (for example, through the Internet using an Internet Service Provider).

Aspects of the present invention are described above and below with reference to flowchart illustrations and/or block diagrams of methods, apparatus (systems) and computer program products according to embodiments of the present invention. It will be understood that each block of the flowchart illustrations, block diagrams, and combinations of blocks in the flowchart illustrations and/or block diagrams of FIGS. 1-4 can be implemented by computer program instructions. These computer program instructions may be provided to a processor of a general purpose computer, special purpose computer, or other programmable data-processing apparatus to produce a machine, such that the instructions, which execute via the processor of the computer or other programmable data-processing apparatus, create means for implementing the functions/acts specified in the flowchart and/or block diagram block or blocks.

These computer program instructions may also be stored in a computer-readable medium that can direct a computer, other programmable data-processing apparatus, or other devices to function in a particular manner, such that the instructions stored in the computer-readable medium produce an article of manufacture, including instructions that implement the function/act specified in the flowchart and/or block diagram block or blocks.

The computer program instructions may also be loaded onto a computer, other programmable data-processing apparatus, or other devices to cause a series of operational steps to be performed on the computer, other programmable apparatus, or other devices to produce a computer-implemented process such that the instructions that execute on the computer or other programmable apparatus provide processes for implementing the functions/acts specified in the flowchart and/or block diagram block or blocks.

The flowchart illustrations and/or block diagrams FIGS. 1-4 illustrate the architecture, functionality, and operation of possible implementations of systems, methods and computer program products according to various embodiments of the present invention. In this regard, each block in the flowchart or block diagrams may represent a module, segment, or portion of code, wherein the module, segment, or portion of code comprises one or more executable instructions for implementing one or more specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special-purpose hardware-based systems that perform the specified functions or acts, or combinations of special-purpose hardware and computer instructions.

In FIG. 1, computer system 101 comprises a processor 103 coupled through one or more I/O Interfaces 109 to one or more hardware data storage devices 111 and one or more I/O devices 113 and 115.

Hardware data storage devices 111 may include, but are not limited to, magnetic tape drives, fixed or removable hard disks, optical discs, storage-equipped mobile devices, and solid-state random-access or read-only storage devices. I/O devices may comprise, but are not limited to: input devices 113, such as keyboards, scanners, handheld telecommunications devices, touch-sensitive displays, tablets, biometric readers, joysticks, trackballs, or computer mice; and output devices 115, which may comprise, but are not limited to printers, plotters, tablets, mobile telephones, displays, or sound-producing devices. Data storage devices 111, input devices 113, and output devices 115 may be located either locally or at remote sites from which they are connected to I/O Interface 109 through a network interface.

Processor 103 may also be connected to one or more memory devices 105, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 105 contains stored computer program code 107, which is a computer program that comprises computer-executable instructions. The stored computer program code includes a program that implements a method of generating a service-catalog entry from discovered attributes of provisioned virtual machines in accordance with embodiments of the present invention, and may implement other embodiments described in this specification, including the methods illustrated in FIGS. 1-4. The data storage devices 111 may store the computer program code 107. Computer program code 107 stored in the storage devices 111 is configured to be executed by processor 103 via the memory devices 105. Processor 103 executes the stored computer program code 107.

Thus the present invention discloses a process for supporting computer infrastructure, integrating, hosting, maintaining, and deploying computer-readable code into the computer system 101, wherein the code in combination with the computer system 101 is capable of performing a method of generating a service-catalog entry from discovered attributes of provisioned virtual machines.

Any of the components of the present invention could be created, integrated, hosted, maintained, deployed, managed, serviced, supported, etc. by a service provider who offers to facilitate a method of generating a service-catalog entry from discovered attributes of provisioned virtual machines. Thus the present invention discloses a process for deploying or integrating computing infrastructure, comprising integrating computer-readable code into the computer system 101, wherein the code in combination with the computer system 101 is capable of performing a method of generating a service-catalog entry from discovered attributes of provisioned virtual machines.

One or more data storage units 111 (or one or more additional memory devices not shown in FIG. 1) may be used as a computer-readable hardware storage device having a computer-readable program embodied therein and/or having other data stored therein, wherein the computer-readable program comprises stored computer program code 107. Generally, a computer program product (or, alternatively, an article of manufacture) of computer system 101 may comprise said computer-readable hardware storage device.

While it is understood that program code 107 for generating a service-catalog entry from discovered attributes of provisioned virtual machines may be deployed by manually loading the program code 107 directly into client, server, and proxy computers (not shown) by loading the program code 107 into a computer-readable storage medium (e.g., computer data storage device 111), program code 107 may also be automatically or semi-automatically deployed into computer system 101 by sending program code 107 to a central server (e.g., computer system 101) or to a group of central servers. Program code 107 may then be downloaded into client computers (not shown) that will execute program code 107.

Alternatively, program code 107 may be sent directly to the client computer via e-mail. Program code 107 may then either be detached to a directory on the client computer or loaded into a directory on the client computer by an e-mail option that selects a program that detaches program code 107 into the directory.

Another alternative is to send program code 107 directly to a directory on the client computer hard drive. If proxy servers are configured, the process selects the proxy server code, determines on which computers to place the proxy servers' code, transmits the proxy server code, and then installs the proxy server code on the proxy computer. Program code 107 is then transmitted to the proxy server and stored on the proxy server.

In one embodiment, program code 107 for generating a service-catalog entry from discovered attributes of provisioned virtual machines is integrated into a client, server and network environment by providing for program code 107 to coexist with software applications (not shown), operating systems (not shown) and network operating systems software (not shown) and then installing program code 107 on the clients and servers in the environment where program code 107 will function.

The first step of the aforementioned integration of code included in program code 107 is to identify any software on the clients and servers, including the network operating system (not shown), where program code 107 will be deployed that are required by program code 107 or that work in conjunction with program code 107. This identified software includes the network operating system, where the network operating system comprises software that enhances a basic operating system by adding networking features. Next, the software applications and version numbers are identified and compared to a list of software applications and correct version numbers that have been tested to work with program code 107. A software application that is missing or that does not match a correct version number is upgraded to the correct version.

A program instruction that passes parameters from program code 107 to a software application is checked to ensure that the instruction's parameter list matches a parameter list required by the program code 107. Conversely, a parameter passed by the software application to program code 107 is checked to ensure that the parameter matches a parameter required by program code 107. The client and server operating systems, including the network operating systems, are identified and compared to a list of operating systems, version numbers, and network software programs that have been tested to work with program code 107. An operating system, version number, or network software program that does not match an entry of the list of tested operating systems and version numbers is upgraded to the listed level on the client computers and upgraded to the listed level on the server computers.

After ensuring that the software, where program code 107 is to be deployed, is at a correct version level that has been tested to work with program code 107, the integration is completed by installing program code 107 on the clients and servers.

Embodiments of the present invention may be implemented as a method performed by a processor of a computer system, as a computer program product, as a computer system, or as a processor-performed process or service for supporting computer infrastructure.

Figure 2:
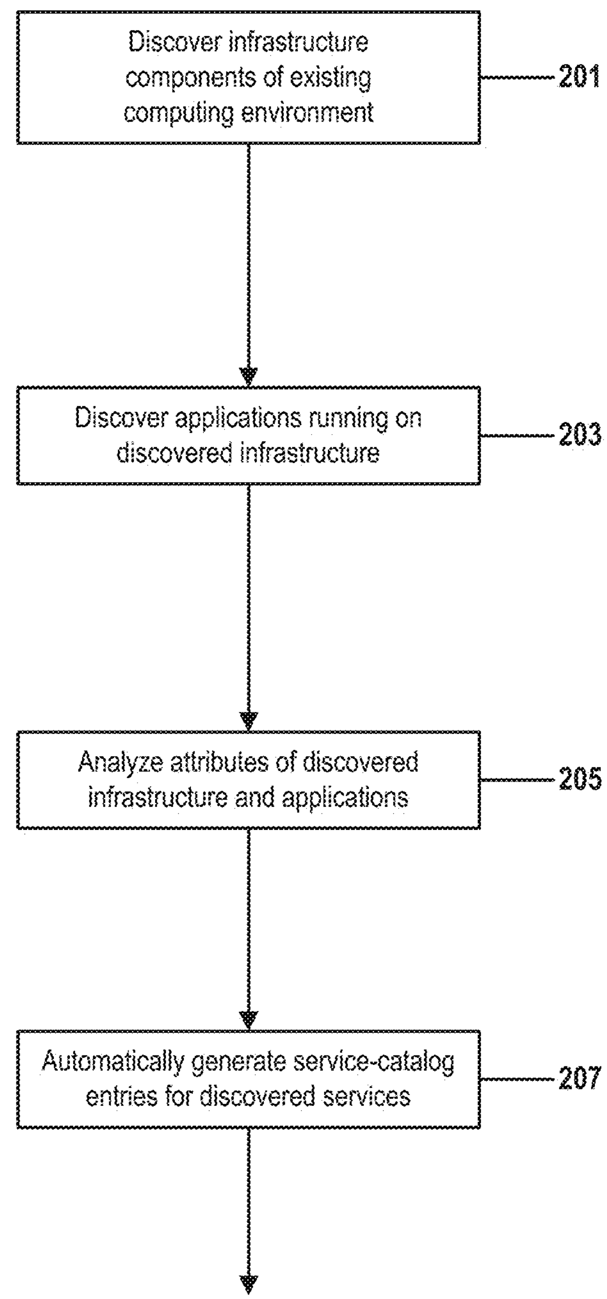
FIG. 2 is a flow chart that illustrates steps of a method of generating a service-catalog entry from discovered attributes of provisioned virtual machines in accordance with embodiments of the present invention.

FIG. 2 is a flow chart that illustrates steps of a method of generating a service-catalog entry from discovered attributes of provisioned virtual machines in accordance with embodiments of the present invention. FIG. 2 contains steps 201-207.

Step 201 begins an analysis of one or more services that are associated with one or more virtual machines, where the one or more virtual machines may have been provisioned on, or are otherwise hosted by, physical resources of an existing computing environment. This existing computing environment may comprise a combination of both non-cloud environments and cloud-computing environments.

An objective of this analysis is to migrate a service of the one or more services to a target cloud-computing environment by automatically generating an entry in a service catalog of the target cloud-computing environment, where the automatically generated entry describes the service to be migrated. In some embodiments, some physical or virtual components or resources may be comprised by both the existing computing environment and the target cloud-computing environment.

This analysis may be performed by functions of a cloud-management platform of the target cloud-computing environment. This cloud-management platform performs tasks related to offering a virtualized "cloud" service to users of the cloud-computing environment, where the offering is a function of an entry in the target cloud-computing environment's service catalog, and where that entry describes a characteristic of the offered virtualized cloud service.

In step 201, the analysis begins by using one or more infrastructure-discovery tools, which may be known to those skilled in the art of cloud computing, to identify the physical infrastructure resources of the existing computing environment, including virtual machines that are provisioned or hosted in the existing computing environment.

As described above, the one or more infrastructure-discovery tools traverse the existing computing environment in order to capture information describing the environment's physical infrastructure. This physical infrastructure may comprise, but is not limited to, a CPU, a storage device, a network interface, an other interface, an other peripheral device, an area of memory, an other internal component of the first physical computer, a physical or virtual connection between the first physical computer and an other physical device, and a physical or virtual connection between the first physical computer and a virtual entity running on the other physical device. Infrastructure may also comprise system software, such as an operating system or a hypervisor.

The infrastructure-discovery tool may further determine which components and resources of the existing computing environment are associated with a virtual machine of the one or more virtual machines, and may further determine a virtual network configuration allocated to a virtual infrastructure abstraction of the physical infrastructure of the existing computing environment.

As described above, the infrastructure-discovery tool may present this information as a topological or an other type of graphical depiction of the one or more provisioned virtual machines and their relationships to the existing computing environment and may automatically identify logical dependencies and other relationships among virtual machines, infrastructure components, and other resources of the existing computing environment.

Step 203 continues the analysis began in step 201 by using one or more application-discovery tools, which may be known to those skilled in the art of cloud computing, to probe the infrastructure discovered in step 201 in order to discover the software applications that are installed or running on the virtual and physical resources identified in step 201. The application-discovery tool may also identify characteristics of the discovered applications, such as revision levels, dependencies upon other software, hardware, communications, or other resources, or configuration settings.

Step 205 continues the analysis of steps 201 and 203 by correlating and analyzing the results of the infrastructure-discovery and application-discovery operations of steps 201 and 203. This continued analysis may comprise a variety of implementation-dependent steps that are functions of the existing or the target computing environment, of a characteristic of a physical or virtual resource or infrastructure component of the existing or the target computing environment, of a software resource or software component of the existing or the target computing environment, of a goal of an entity that owns, manages, or uses a resource or component of the existing or the target computing environment, or of issues related to platform constraints, configuration constraints, revision levels, power, efficiency, productivity, licensing, contractual terms, or other factors.

In some embodiments, the continued analysis of step 205 may comprise identifying a unique application installed on a virtual machine discovered in step 201.

In some embodiments, the continued analysis of step 205 may comprise using information that may have been discovered in step 201 or step 203 to build a list of software applications installed on the one or more virtual machines of the existing computing environment in order to build a list of unique possible combinations of virtual machines provisioned in the existing computing environment and applications that may be deployed on those virtual machines, wherein a possible combination of the list of unique possible combinations may be deemed "possible" only if it satisfies a condition.

In some embodiments, the continued analysis of step 205 may comprise comparing a first characteristic of a first configuration a first virtual machine to a second characteristic of a second configuration of a second virtual machine, where the first and second configurations may have been discovered in step 201 or step 203, where the first virtual machine and the second virtual machine may each be deployed on either a same component or on distinct components of the physical infrastructure of the existing computing environment, and where the same component or the distinct components may each comprise one or more physical infrastructure resources that may include, but are not limited to, a CPU, memory, storage device, communications network, or other infrastructure component or resource.

In some embodiments, the continued analysis of step 205 may comprise using information that may have been discovered in step 201 or step 203 to build a unique list of operating systems by comparing a patch revision level or an operating system revision level of a first operating system installed on the first virtual machine with a patch revision level or an operating system revision level of a second operating system installed on the first virtual machine.

In some embodiments, the continued analysis of step 205 may comprise using information that may have been discovered in step 201 or step 203 to build a list of unique virtual machines provisioned in the existing operating environment, where a pair of virtual machines in this list may be deemed unique and distinct by discounting a difference of a value of a parameter, such as a characteristic of a CPU, memory, storage, or communications resource, associated with each of the two virtual machines, and where the hypervisors associated with the two virtual machines are configured to permit the difference between the values of the parameter.

In some embodiments, the continued analysis of step 205 may comprise using information that may have been discovered in step 201 or step 203 to build a list of unique virtual machines provisioned in the existing operating environment, where a pair of virtual machines in this list may be deemed unique and distinct as a function of a comparison of a first virtual network configuration of a first hypervisor of a first virtual machine of the pair of virtual machines with a second virtual network configuration of a second hypervisor of a second virtual machine of the pair of virtual machines, where each virtual network configuration is used by its associated hypervisor to manage resources comprised by the physical infrastructure of the existing operating environment.

In some embodiments, the continued analysis of step 205 may comprise using information discovered in steps 201 and 203 to facilitate a querying of a classification software application to retrieve a configuration attribute for a discovered application. In some embodiments, the classification software application may be comprised by an application-discovery tool.

At the completion of step 205, the cloud-management platform may have used information discovered in steps 201 and 203 to assemble lists of combinations of applications, virtual machines, or other virtual or physical infrastructure and software components and resources of the existing computing environment, and may have analyzed and organized entries of these lists in order to reduce or eliminate redundant entries, duplicate entries, or types of other entries that satisfy or fail to satisfy a condition.

In step 207, the virtual machines and associated resources and components discovered in steps 201 and 203 are brought under the administrative control of the cloud-management platform by using information in the lists generated in step 205 to automatically generate entries to be added to the cloud-computing environment's service catalog.

Such an automatically generated entry describes a characteristic of a service that may be offered to a user by the cloud-management platform, where the service may be provided to the user upon request, where that function may comprise one or more applications running on one or more virtual machines, and where the one or more virtual machines and associated applications are provisioned or run by the cloud-management platform in response to the user's request. The configuration, settings, or other requirements of the instantiation of virtual resources that are provisioned or run in order to provide the requested service, as well as physical hardware and software resources needed to provision or run the instantiation and its associated applications, are specified in the service's corresponding service-catalog entry.

The information stored in an automatically generated service-catalog entry may thus describe a characteristic of a particular combination of physical and virtual resources that must be deployed in the target computing requirement when a user requests a service associated with the entry. Step 205 determines such entry information as a function of information discovered in steps 201 and 203 about applications and infrastructure in the existing computing environment.

Upon completion of step 205, the cloud-management platform of the target computing environment may thus be able to use information stored in an automatically generated service-catalog entry to determine how to provision and configure resources of the existing computing environment needed to provide a requested service, where that provisioning and configuring may include provisioning a virtual machine or deploying a new instance of an application program according to specifications or configuration rules specified by the entry.

Such an automatically generated entry may describe a service that will be added to the list of services offered by the cloud-computing environment, wherein the added service may be associated with a unique combination of physical and virtual resources of the existing computing environment.

In some embodiments, an automatically generated service-catalog entry may describe a virtual machine that has exactly the same configuration or an other characteristic of a virtual machine discovered in step 201 or 203. Such a configuration or characteristic may be a function of parameters that comprise, but are not limited to, combinations of a size of RAM memory, a hard drive capacity, a revision level, or a number or type of network interface cards. In some embodiments, a service entry may describe a unique combination of components and characteristics that may comprise, but are not limited to: an operating system, an installed operating system patch or upgrade, an infrastructure component, a middleware application (such as an installation of the WebLogic Server e-commerce transaction platform), a software revision level, or an other application attribute (such as a Java heap size, a communications configuration, or a security setting).

In other embodiments, an automatically generated service-catalog entry may comprise a description of a deployment pattern or of a deployment workflow.

In some embodiments, an automatically generated service-catalog entry may be formatted or structured in compliance with an open-standard format, such as the Open Virtualization Format (OVF) standard (ANSI standard INCITS 469-2010) for packaging and distributing virtual appliances and other types of software that runs on a virtual machine, or an other standard or commonly practiced or known standard or convention.

In some embodiments, all or part of the procedure of FIG. 2 may be packaged or implemented as a Service-Catalog Generation Utility or Service-Catalog Entry Generation Utility. This package or implementation may comprise either a distinct software application or module or may be comprised by one or more components of one or more cloud-management platforms.

In some embodiments, an automatically generated service-catalog entry may comprise a unique or minimal combination of operating-system and application software attributes. Such an embodiment, may allow a cloud-management platform to provision a business application or virtual service one virtual machine and application at a time. This more granular approach to deployment or provisioning of business applications and services may facilitate adherence to relationships, dependencies, and other constraints among virtual machines and applications, and may help ensure the cloud-management platform's ability to perform required application-management functions, such as application startup, configuration, updating, and shutdown. Here, the relationships, dependencies, and other constraints may be related to entities that comprise, but are not limited to, network connections, network port selection, file-system permissions, and cluster configurations.

In an embodiment, the analysis of step 205 comprises a determination of a list of unique applications installed on virtual machines of the existing computer platform and an automatic generation of one or more service entries that each describe a service to be offered by the target cloud-computing environment, wherein each described service is a function of one or more unique application of the list of unique applications.

In some embodiments, an automatically generated service-catalog entry may comprise a unique or minimal combination of operating system and application software attributes.

In some embodiments, an automatically generated service-catalog entry may make it possible for a cloud-management platform to allow a user to provision a corresponding business application by means of a self-service user interface. In such cases, an automatically generated service-catalog entry may describe an entire topology of the business application.

An automatically generated service-catalog entry that comprises discovered physical and logical attributes of an entity of the existing computing environment may specify that no changes to these attributes should be allowed when a user requests a service in the target computing environment based on the entry. In some cases, such an entry may describe a legacy application for which little or no support is available in the target cloud-computing environment.

An automatically generated service-catalog entry that comprises discovered physical and logical attributes of an entity of the existing computing environment may specify that a subset of attributes described by the entry may not be changed in a certain way or under certain conditions during instantiation of a service described by the entry. A service-catalog entry might, for example, be configured to bar a cloud-management platform or a user from changing certain characteristics of virtualized network interface cards deployed on a virtual machine associated with the entry.

An automatically generated service-catalog entry may comprise a partial or complete logical representation or other function of discovered physical and logical attributes of an entity of the existing computing environment. In some cases, such an entry may describe a legacy application for which little or no support is available in the target cloud-computing environment.

In some embodiments, an automatically generated service-catalog entry may comprise a description of one or more characteristics of a virtual storage medium provisioned in the existing computing environment, such as a hard-drive image, or a description of a clone of a virtual machine provisioned in the existing computing environment. Such an entry may describe a characteristic of one or more configured software applications or of a characteristic of a virtual machine such as a CPU, memory, storage, or communications configuration, dependency, or an other requirement.

In some embodiments, an automatically generated service-catalog entry may comprise a description of a service offering or business application that comprises a grouping of one or more component services described in the service catalog. Such a component services may each comprise one or more applications, where the one or more component services were discovered by the application-discovery tool in step 203 to be related to each other as unique virtual machines on which related, discovered software applications are deployed; or as a combination of related applications with a combination virtual machines wherein instances of an application of the combination of applications may be deployed with distinct or unique configurations.

In some embodiments, an automatically generated service-catalog entry may comprise a base operating-system image that specifies a particular patch or upgrade of an application, of an operating software entity, of an other physical or virtual resource, or of a combination thereof. In one example, a first service may comprise a first virtual machine running a RedHat v5.4 operating system and a WebLogic Server v10.3.4 application-server middleware and a second service may comprise a second virtual machine running RedHat 5.4 with WebLogic Server 10.3.5.

Some embodiments of the present invention might automatically generate a service-catalog entry that describes characteristics of both operating-system software and application software entities associated with a discovered virtual machine. In such an embodiment, the two exemplary virtual-machine deployments enumerated above might be represented by two automatically generated service-catalog entries. A first entry might describe a first service "RHEL54_WLS1034," which comprises deployment of RedHat v5.4 and WebLogic Server v10.3.4; and a second entry might describe a second service "RHEL54_WLS1035," which comprises deployment of RedHat v5.4 and WebLogic Server v10.3.5.

But in other embodiments, an automatically generated service-catalog entry might describe either operating-system software or application software entities, but not both. In such a case, the two virtual-machine deployments enumerated above might spawn three two automatically generated service-catalog entries, each of which describes characteristics of one distinct discovered software entity, not in combination with any other entity. Here, a first entry might describe a "RHEL54" first service based on a virtual machine running the RedHat v5.4 operating system; a second entry might describe a "WLS_1034 deployment pattern" second service based on a deployment of WebLogic Server v10.34; and a third entry might describe a "WLS_1035 deployment pattern" third service based on a deployment of WebLogic Server v10.3.5. In some embodiments, a cloud-management platform might be able to layer one or more automatically generated service-catalog entries in order to build an offered service or business application that may be provisioned on more than one virtual machine.

In some embodiments, automatically generated service catalog entries may each comprise a common "application representation," where an application representation might specify a unique or specific combination of virtual or physical platform or infrastructure components or resources, such as a specific combination of revisions of a Web server operating system and a database-management system application.

In some embodiments, the cloud-management platform of the target computing environment may collaborate with resources or platforms of one or more remote cloud-computing environments to identify service offerings that may match information discovered in steps 201 and 203, and may automatically generate a service-catalog entry that requires federation with a resource or platform of a remote cloud-computing environment in order to instantiate that entry when a service requested by a user.

In some embodiments, an automatically generated service-catalog entry may be further generated as a function of other conditions. In one example, an other condition may be a rule that constrains a choice of physical location for deployments of a certain combination of application and system software entities. An software vendor's extrinsic collocation requirement, for example, might require an automatically generated service-catalog entry to constrain a service comprising two instances of the vendor's database-management application, each running on a distinct virtual machine, to be instantiated on two hosts that are anti-collocated (that is, installed at different sites).

In some embodiments, an automatically generated service-catalog entry may be designated as being accessible only to cloud administrators or to other authorized users.

Methods in conformance with embodiments of the present invention may comprise other variations of the method of FIG. 2 when automatically generating service-catalog entries as a function of infrastructure and application information discovered in steps 201 and 203. Examples cited in this document are for illustrative purposes only and are not meant to limit embodiments of the present invention to characteristics specific to those examples.

Figure 3:
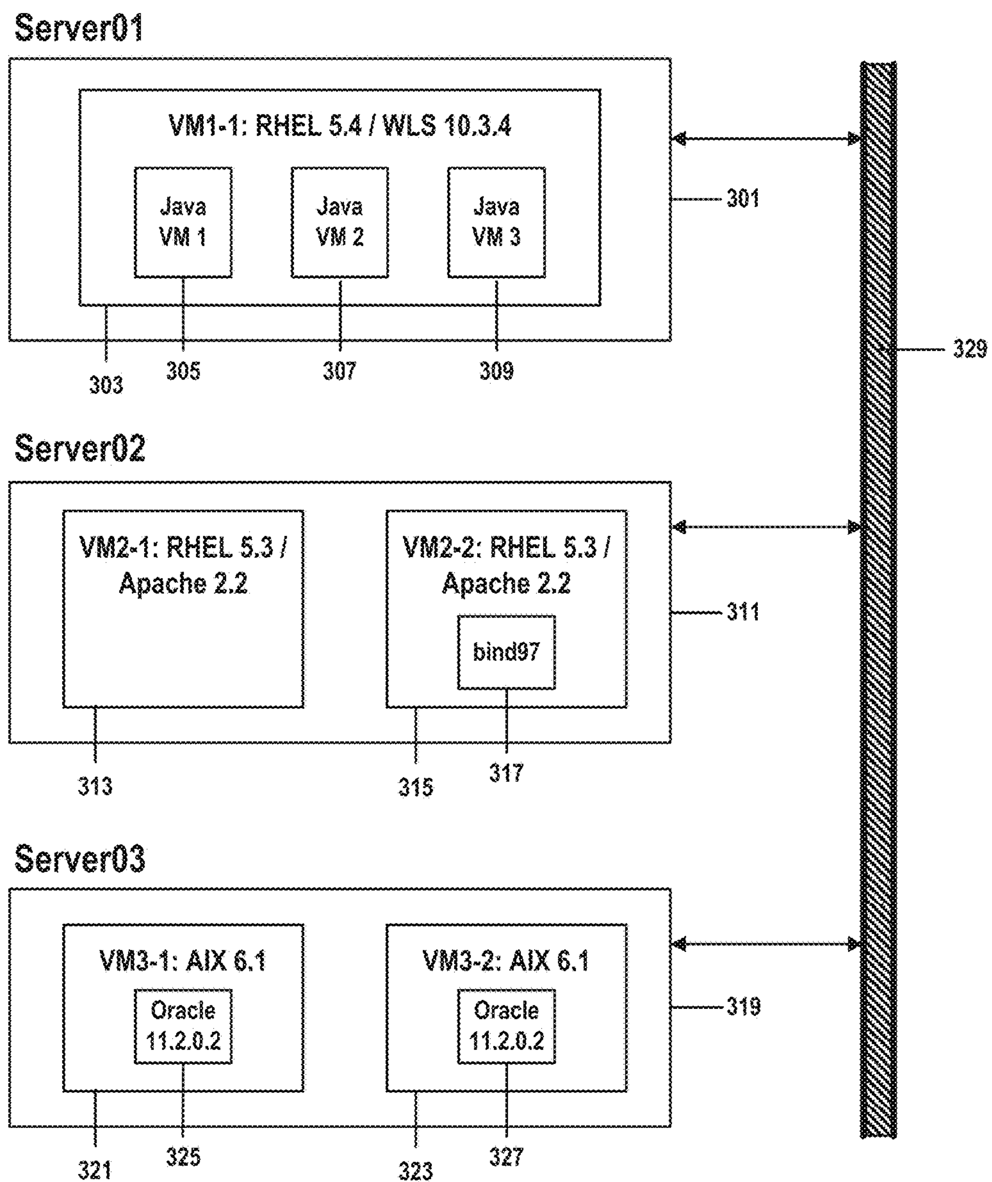
FIG. 3 shows an example of a non-cloud computing environment, as described in FIG. 2.

FIG. 3 shows an example of a non-cloud computing environment, as described in FIG. 2. The narrative below correlates FIG. 2 and FIG. 3 by showing how the method of FIG. 2 would automatically generate service-catalog entries for the non-cloud computing environment shown in FIG. 3. FIG. 3 comprises items 301-329.

FIG. 3 shows an existing non-cloud computing environment that comprises three physical servers 301, 311, and 319 connected to a network backbone 329.

Server01 301 hosts one virtual machine VM1-1 303, which in turn runs an instance of the Red Hat Enterprise Linux 5.4 operating system (RHEL 5.4) and the Oracle WebLogic Server 10.3.4 (WLS 10.3.4) application-server middleware. Three Java virtual-machine applications 305-309 run on virtual machine VM1-1 303.

Server02 311 hosts two virtual machines VM2-1 313 and VM2-2 315, each of which run an instance of the Red Hat Enterprise Linux 5.3 operating system (RHEL 5.4) and the Apache 2.2 middleware. An open-source domain name system (DNS) application package bind97-9.7.0.17.P2.el5_9.1.i386.rpm 317 is installed on the second virtual machine VM2-2 315.

Server03 hosts two virtual machines VM3-1 321 and VM3-2 323, each of which run an instance of the IBM AIX 6.1 operating system in a distinct logical partition. A first instance of the Oracle database-management system application 325, version 11.2.0.2, is installed on the first virtual machine VM3-1 321 and a second instance of the Oracle database-management system application 327, version 11.2.0.2, is installed on the second virtual machine VM3-1 321.

The method of FIG. 2 may be used to migrate the business applications or services running on these three servers in the non-cloud virtualized existing computing environment of FIG. 3 to a target cloud-computing environment, by automatically generating a set of unique entries for a service catalog of the target cloud-computing environment, where each entry may describe all or part of one or more of these business applications or services, and where each automatically generated service-catalog entry is unique and distinct from any other entry in the service catalog.

Here, when a user requests a business application service from the cloud-computing environment, the cloud-computing environment requests the application, or an associated service, from the cloud-management platform. The cloud-management platform refers to the service catalog in order to identify one or more entries of the service catalog that describes characteristics of the requested service. If the cloud-management platform identifies such an entry or entries, it may use information in those identified entries to provision resources necessary to provide the requested application or service. The information in those entries may comprise, but is not limited to, a listing of components of an application and components of an operating environment in which the application components are installed and launched, a description of configuration settings or revision levels of the application and the operating environment, and descriptions of other virtual or physical resources required in order to provide the requested business application or services.

In this example, the method of FIG. 2, wherein entries of the service catalog that describe virtualized services and business applications not yet within the scope of the cloud-management platform are automatically generated, begins with an analysis step wherein a cloud-management platform of the target cloud-computing environment receives information from an infrastructure-discovery tool that analyzes the existing computing environment. This received information may describe the virtual and physical infrastructure of the existing computing environment.

In this example the infrastructure-discovery tool returns information that describes the three servers 301, 311, and 319, identifying one virtual machine VM1-1 303 running Red Hat 5.4 and WebLogic Server 10.3.4 on Server01 301, two virtual machines VM2-1 313 and VM2-2 315 running Red Hat 5.3 and Apache 2.2 on Server02 311, and two virtual machines VM3-1 323 and VM3-2 323 running AIX 6.1 on Server03 319.

The infrastructure-discovery tool may further return additional information related to the configuration of physical and virtual resources related to each virtual machine, such as the number, speed, and type of network interfaces used by each virtual machine, the operating system or hypervisor under which each virtual machine runs, or the quantity and type of secondary storage available to each virtual machine.

This returned information may take the form of raw, enumerated listings of data or may be presented as a topology that describes connectivity and dependencies among discovered virtual machines and their associated physical and virtual resources.

The cloud-management platform of the target cloud-computing environment next receives information from an application-discovery tool that analyzes applications running on the existing computing environment infrastructure components discovered by the infrastructure-discovery tool.

In this example, the cloud-management platform would receive information from the application-discovery tool that identifies the three Java VM applications, 305, 307, and 309, running on virtual machine VM1-1 301, the bind97 application running on virtual machine VM2-2 317, a first instance of the Oracle database-management application 325 running on virtual machine VM3-1 321, and a second instance of the Oracle database application 327 running on virtual machine VM3-2 323.

The method of the present invention might then perform implementation-dependent comparison and analysis functions, including, but not limited to, those discussed above in the description of step 205 of FIG. 2, in order to generate a set of service-catalog entries that describe the business applications or services illustrated in FIG. 3.

Such entries may be in an open-source format, as described above, or may be in an other implementation-dependent form dictated all or in part by a characteristic of the cloud-computing environment. These automatically generated entries may each be unique or distinct, but in some embodiments, when necessary in order to accurately represent the business applications or services being imported into the cloud-computing environment, some entries may share duplicate or redundant information.

In one embodiment, these automatically generated service-catalog entries may be represented logically as records that each comprise an "Image Name" service-identifier field and a "Deployment Details" field that describes characteristics of a standardized virtual machine to be provisioned in order to provide the service.

In the table below, for example, record 1 represents a service-catalog entry generated from received discovery-tool information that describes virtual machine VM1-1 301. Here, record 1 identifies the Red Hat 5.4 ("RHEL54") operating system and WebLogic Server 10.3.4 ("WLS1034") middleware running on virtual machine VM1-1 301, and further describes discovered characteristics of the virtual machine associated with this business application or service. Here, the virtual machine might comprise a virtual four-core Intel x86 processor configured with 8 GB of RAM memory, a 100-GB hard drive, and three network interface cards, wherein the configuration of this virtual machine may be a function of the configuration of discovered virtual machine VM1-1 301 in the existing computing environment, or may be a further function of a characteristic of the target cloud-computing environment.

Similarly other entries in this listing represent business applications or virtual services provided by the other virtual machines 303, 313, 315, 321, and 323 of FIG. 3. In other implementations, many other possible combinations of physical hosts or servers, virtual machines, operating systems, middleware, applications, hardware components, communications devices, and other physical or virtual resources may be discovered and used to automatically generate service-catalog entries.

| | Image Name | Deployment Details |
|---|---|---|
| 1-1 | RHEL54_WLS1034 | Intel x86 VM with 4 CPU cores, 8 GB RAM, 100 GB HDD, with RHEL 5.4, WLS 10.3.4, 3 NICs |
| 2-1 | RHEL53_Apache22x | Intel x86 VM with 2 CPU cores, 4 GB RAM, 30 GB HDD, with RHEL 5.3, Apache 2.2.x, 3 NICs |
| 2-2 | RHEL53_Apache22x_bind | Intel x86 VM with 4 CPU cores, 8 GB RAM, 60 GB HDD, with RHEL 5.3, Apache 2.2.x with bind97 rpm package, 3 NICs |
| 3-1 | AIX61_Ora11202 | AIX LPAR with 4 CPU cores, 16 GB RAM, 500 GB HDD, with AIX 6.1, Oracle 11.2.0.2, 3 NICs |
| 3-2 | AIX61_Ora11202 | AIX LPAR with 4 CPU cores, 32 GB RAM, 500 GB HDD, with AIX 6.1, Oracle 11.2.0.2, 3 NICs |

In another embodiment, the method of FIG. 2 might create a single service-catalog entry for a business application or service that comprises all five virtual machines shown in FIG. 3 and discovered by the infrastructure-discovery and application-discovery tools. In such embodiments, characteristics of the existing computing platform and target cloud-computing platform may determine whether such a result is appropriate.

Such an entry might be represented as:

| Application | Images |
|---|---|
| VM1-1 - 3-2 | 1 x RHEL54_WLS1034<br>1 x RHEL56_Apache22x<br>1 x RHEL56 _Apache22x_bind<br>2 x AIX61_Ora11202 |

In variations of this embodiment, this single entry might contain additional or different information, such as a system-configuration detail of a virtual machine or of a virtual peripheral associated with the virtual machine.

In yet another embodiment, the method of FIG. 2 might create distinct service-catalog entries for each system-software component and middleware component, possibly allowing the cloud-management platform to provide users the flexibility to request combinations of the business applications and services represented by the more granular entries.

One example of such an embodiment is the below representation of service-catalog entries generated automatically by the method of FIG. 2 from the example existing computing environment of FIG. 3.

Here, as above, each record in the table is a logical representation of a business application or virtual service that may be provided by the cloud-management platform, where the business application or virtual service is a function of applications and services discovered running on virtualized resources in the existing computing environment.

| Image Name | Deployment Details |
|---|---|
| RHEL_54 | Intel x86 VM with 4 CPU cores, 8 GB RAM, 100 GB HDD, with RHEL 5.4 |
| RHEL_53 | Intel x86 VM with 4 CPU cores, 8 GB RAM, 100 GB HDD, with RHEL 5.6 |
| WLS_1034 | WebLogic Server 10.3.4 install |
| Bind_97 | Bind97 rpm package install |
| AIX_Ora11202 | AIX LPAR with 4 CPU cores, 16 GB RAM, 500 GB HDD, with Aix 6.1, Oracle 11.2.0.2, 3 NICs |
| Apache_22x | Apache 2.2.x install |

Many other possible embodiments of these methods are possible, based on the factors enumerated above. An automatically generated entry may, for example, describe only a particular revision level of an operating-software component, such as "RHEL 5.4 32 bit". Alternatively, an entry might describe both the operating-software component and a deployment workflow for installing a specific patch to the software, such as "RHEL 5.4 32 bit with bind97 package."

In yet another embodiment, an automatically generated service-catalog entry might represent a deployment workflow dependency, wherein installation of a "bind97" patch is dependent upon prior installation of a RHEL5.4 operating system. In this example, the dependency represented in the automatically generated service-catalog entry would bar a user from requesting a service to be configured to run under a RHEL5.6 operating system with a bind97 patch.

Common to all these embodiments, however, is the concept of using information discovered about physical and virtual components and resources of an infrastructure of and applications of a virtualized computing environment to automatically generate service-catalog entries of a cloud-computing environment, wherein those automatically generated entries allow users of the cloud-computing environment to request a business applications or virtualized services analogous to those provisioned in the existing computing environment.

What is claimed is:

1. A method for automatically migrating a legacy non-cloud application into a cloud-computing environment, the method comprising:

receiving, by a processor of a cloud-management system of the cloud-computing environment, infrastructure information about a virtualized computing infrastructure of a legacy virtualized non-cloud computing environment, where the infrastructure information is automatically identified by an infrastructure-discovery module hosted by the cloud-computing environment, where the virtualized computing infrastructure comprises a first virtual machine, provisioned on a first physical computer, that hosts a first application, and where the received infrastructure information comprises a characteristic of the first virtual machine; and inserting, by the processor, a new entry into a service catalog of the cloud-computing environment where the new entry is configured as a function of the received infrastructure information, of a characteristic of the cloud-computing environment, and of a characteristic of a virtual service required by the first application, where the virtual service is a legacy application hosted on the legacy virtualized non-cloud computing environment, and where the new entry comprises information associated with migrating the virtual service from the legacy virtualized non-cloud environment to the cloud-computing environment.

2. The method of claim 1, where the infrastructure information further comprises a characteristic of an infrastructure entity associated with the first virtual machine, and where the infrastructure entity is selected from the group consisting of: a storage device, a network interface, another interface, another peripheral device, a CPU, an area of memory, another internal component of the first physical computer, a physical or virtual connection between the first physical computer and another physical device, and a physical or virtual connection between the first physical computer and a virtual entity associated with the other physical device.

3. The method of claim 1, further comprising:

receiving, by the processor, application information about a characteristic of the first application from an application-discovery module hosted by the cloud-computing environment, where the application information further comprises a characteristic of a software or firmware entity associated with the first virtual machine, and where the software entity is selected from the group consisting of: the first virtual machine, an operating system, a hypervisor, a middleware software entity, another application, an entity of an operating environment associated with running the first application on the first physical computer, another virtual machine provisioned on the first physical computer, and another virtual machine that is not provisioned on the first physical computer.

4. The method of claim 3, where the characteristic of the software entity is selected from the group consisting of: a deployment workflow for installing a patch to the software entity, a version of the software entity, an upgrade history of the software entity, or a compatibility of the software entity with a second software entity.

5. The method of claim 1, where the new entry comprises information about software running on the first virtual machine, where the software comprises either system software or application software, but not both.

6. The method of claim 1, where the new entry comprises information about software running on the first virtual machine, where the software comprises both system software and application software.

7. The method of claim 1, where the new entry comprises information selected from the group comprising: information about a method of deploying software on the first virtual machine, information about a dependency relationship between a pair of software programs that are deployed on the first virtual machine, and information about a combination of a system software entity and an application software entity, where the combination comprises information about an entity that does not run on the first virtual machine.

8. The method of claim 1, further comprising providing at least one support service for at least one of creating, integrating, hosting, maintaining, and deploying computer-readable program code in the computer system, where the computer-readable program code in combination with the computer system is configured to implement the receiving and the inserting.

9. A computer program product, comprising a computer-readable hardware storage device having a computer-readable program code stored therein, the program code configured to be executed by a processor of a cloud-management system of a cloud-computing environment to implement a method for automatically migrating a legacy non-cloud application into the cloud-computing environment, the method comprising:

receiving, by the processor, infrastructure information about a virtualized computing infrastructure of a legacy virtualized non-cloud computing environment, where the infrastructure information is automatically identified by an infrastructure-discovery module hosted by the cloud-computing environment, where the virtualized computing infrastructure comprises a first virtual machine, provisioned on a first physical computer, that hosts a first application, and where the received infrastructure information comprises a characteristic of the first virtual machine; and inserting, by the processor, a new entry into a service catalog of the cloud-computing environment where the new entry is configured as a function of the received infrastructure information, of a characteristic of the cloud-computing environment, and of a characteristic of a virtual service required by the first application, where the virtual service is a legacy application hosted on the legacy virtualized non-cloud computing environment, and where the new entry comprises information associated with migrating the virtual service from the legacy virtualized non-cloud environment to the cloud-computing environment.

10. The computer program product of claim 9, where the infrastructure information further comprises a characteristic of an infrastructure entity associated with the first virtual machine, and where the infrastructure entity is selected from the group consisting of: a storage device, a network interface, another interface, another peripheral device, a CPU, an area of memory, another internal component of the first physical computer, a physical or virtual connection between the first physical computer and another physical device, and a physical or virtual connection between the first physical computer and a virtual entity associated with the other physical device.

11. The computer program product of claim 9, further comprising:

receiving, by the processor, application information about a characteristic of the first application from an application-discovery module hosted by the cloud-computing environment, where the application information further comprises a characteristic of a software or firmware entity associated with the first virtual machine, and where the software entity is selected from the group consisting of: the first virtual machine, an operating system, a hypervisor, a middleware software entity, another application, an entity of an operating environment associated with running the first application on the first physical computer, another virtual machine provisioned on the first physical computer, and another virtual machine that is not provisioned on the first physical computer.

12. The computer program product of claim 11, where the characteristic of the software entity is selected from the group consisting of: a deployment workflow for installing a patch to the software entity, a version of the software entity, an upgrade history of the software entity, or a compatibility of the software entity with a second software entity.

13. The computer program product of claim 9, where the new entry comprises information about software running on the first virtual machine, where the software comprises either system software or application software, but not both.

14. The computer program product of claim 9, where the new entry comprises information about software running on the first virtual machine, where the software comprises both system software and application software.

15. The computer program product of claim 9, where the new entry comprises information selected from the group comprising: information about a method of deploying software on the first virtual machine, information about a dependency relationship between a pair of software programs that are deployed on the first virtual machine, and information about a combination of a system software entity and an application software entity, where the combination comprises information about an entity that does not run on the first virtual machine.

16. A cloud-management system of a cloud-computing environment comprising a processor, a memory coupled to the processor, and a computer-readable hardware storage device coupled to the processor, the storage device containing program code configured to be run by the processor via the memory to implement a a method for automatically migrating a legacy non-cloud application into the cloud-computing environment, the method comprising:

receiving, by the processor, infrastructure information about a virtualized computing infrastructure of a legacy virtualized non-cloud computing environment, where the infrastructure information is automatically identified by an infrastructure-discovery module hosted by the cloud-computing environment, where the virtualized computing infrastructure comprises a first virtual machine, provisioned on a first physical computer, that hosts a first application, and where the received infrastructure information comprises a characteristic of the first virtual machine; and inserting, by the processor, a new entry into a service catalog of the cloud-computing environment where the new entry is configured as a function of the received infrastructure information, of a characteristic of the cloud-computing environment, and of a characteristic of a virtual service required by the first application, where the virtual service is a legacy application hosted on the legacy virtualized non-cloud computing environment, and where the new entry comprises information associated with migrating the virtual service from the legacy virtualized non-cloud environment to the cloud-computing environment.

17. The cloud-management system of claim 16, where the infrastructure information further comprises a characteristic of an infrastructure entity associated with the first virtual machine, and where the infrastructure entity is selected from the group consisting of: a storage device, a network interface, another interface, another peripheral device, a CPU, an area of memory, another internal component of the first physical computer, a physical or virtual connection between the first physical computer and another physical device, and a physical or virtual connection between the first physical computer and a virtual entity associated with the other physical device.

18. The cloud-management system of claim 16, further comprising:

receiving, by the processor, application information about a characteristic of the first application from an application-discovery module hosted by the cloud-computing environment, where the application information further comprises a characteristic of a software or firmware entity associated with the first virtual machine, and where the software entity is selected from the group consisting of: the first virtual machine, an operating system, a hypervisor, a middleware software entity, another application, an entity of an operating environment associated with running the first application on the first physical computer, another virtual machine provisioned on the first physical computer, and another virtual machine that is not provisioned on the first physical computer.

19. The cloud-management system of claim 18, where the characteristic of the software entity is selected from the group consisting of: a deployment workflow for installing a patch to the software entity, a version of the software entity, an upgrade history of the software entity, or a compatibility of the software entity with a second software entity.

20. The cloud-management system of claim 16, where the new entry comprises information about software running on the first virtual machine, where the software comprises either system software or application software, but not both.

* * * * *